United States Patent
Kunishige et al.

(10) Patent No.: US 10,469,746 B2
(45) Date of Patent: **\*Nov. 5, 2019**

(54) CAMERA AND CAMERA CONTROL METHOD

(71) Applicant: Olympus Corporation, Shibuya-ku, Tokyo (JP)

(72) Inventors: Keiji Kunishige, Tokyo (JP); Satoshi Miyazaki, Tokyo (JP); Osamu Nonaka, Kanagawa (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/873,970

(22) Filed: Oct. 2, 2015

(65) Prior Publication Data

US 2016/0028955 A1    Jan. 28, 2016

Related U.S. Application Data

(63) Continuation of application No. 13/964,007, filed on Aug. 9, 2013, now Pat. No. 9,185,370, which is a
(Continued)

(30) Foreign Application Priority Data

Jul. 30, 2009    (JP) ................................ 2009-177250

(51) Int. Cl.
*H04N 5/232* (2006.01)
*H04N 5/262* (2006.01)
*H04N 9/07* (2006.01)

(52) U.S. Cl.
CPC ......... *H04N 5/23245* (2013.01); *H04N 5/232* (2013.01); *H04N 5/23219* (2013.01);
(Continued)

(58) Field of Classification Search
CPC .... H04N 5/23245; H04N 9/07; H04N 5/2621; H04N 5/23219; H04N 5/232; H04N 2201/3247
See application file for complete search history.

(56) References Cited

U.S. PATENT DOCUMENTS 5,767,922 A * 6/1998 Zabih ................. G06K 9/00711
348/699
2004/0264921 A1   12/2004 Ono
(Continued)

FOREIGN PATENT DOCUMENTS

EP    1791357 A1 *  5/2007 ........... H04N 1/2104
JP    2008-258926    10/2008

OTHER PUBLICATIONS

Chinese Office Action to corresponding Chinese Patent Application No. 201310241436.5, dated Dec. 28, 2015 (5 pgs.).
(Continued)

*Primary Examiner* — Timothy J Henn
(74) *Attorney, Agent, or Firm* — John C. Pokotylo; Pokotylo Patent Services (57) ABSTRACT

A camera according to the present invention, which is capable of continuous shooting before and after a still image shot according to photographer's operation, comprises: an imaging section converting an object image into image data; a still image shooting section obtaining image data of the still image according to release operation; a continuous shooting section obtaining the image data by continuous shooting before and after the obtaining of the still image in the still image shooting section; an image processing section performing image processing which is different from that of the image data obtained by the still image shooting section and changed sequentially, on the image data obtained by the continuous shooting section; and a recording section record-
(Continued)

ing the image data image-processed by the image processing section.

20 Claims, 10 Drawing Sheets

Related U.S. Application Data continuation of application No. 12/844,768, filed on Jul. 27, 2010, now Pat. No. 8,525,894.

(52) U.S. Cl.
CPC ............. *H04N 5/2621* (2013.01); *H04N 9/07* (2013.01); *H04N 2201/3247* (2013.01)

(56) References Cited

U.S. PATENT DOCUMENTS

| | | | | |
|---|---|---|---|---|
| 2005/0219372 A1* | 10/2005 | Watanabe | ............. | H04M 1/021 348/207.99 |
| 2005/0220349 A1 | 10/2005 | Furuya | | |
| 2007/0115368 A1* | 5/2007 | Kamiya | ............... | H04N 1/2112 348/220.1 |
| 2008/0118220 A1* | 5/2008 | Park | ....................... | H04N 5/772 386/333 |
| 2008/0129854 A1* | 6/2008 | Onoda | ................. | H04N 1/2145 348/295 |
| 2009/0051515 A1* | 2/2009 | Fujinawa | .................. | B60R 1/00 340/436 |
| 2009/0309988 A1* | 12/2009 | Kubo | ................... | H04N 1/2104 348/220.1 |
| 2010/0085439 A1* | 4/2010 | Lin | ....................... | G03B 17/14 348/222.1 |

OTHER PUBLICATIONS

Second Chinese Office Action to corresponding Chinese Patent Application No. 2013/10241436.5, dated Jul. 20, 2016 (4 pgs).

Office Action to corresponding Chinese Patent Application No. 201310241436.5, dated Jan. 4, 2017 (4 pgs.).

* cited by examiner

| STILL IMAGE | WITH FACE ONE PERSON | | | |
|---|---|---|---|---|
| MOVING IMAGE COMPARISON | NO MOVEMENT IN BOTH | MOVEMENT IN BOTH | MOVEMENT IN MOVING IMAGE 1 | MOVEMENT IN MOVING IMAGE 2 |
| EFFECT | MOVING IMAGE 1 | UP TO NORMAL | FADE-IN | FADE-IN | UP TO NORMAL |
| | MOVING IMAGE 2 | NORMAL TO UP | FADE-OUT | NOMARL TO UP | FADE-OUT |

FIG. 6B

| STILL IMAGE | WITH FACE TWO OR MORE PERSONS | | | |
|---|---|---|---|---|
| MOVING IMAGE COMPARISON | NO MOVEMENT IN BOTH | MOVEMENT IN BOTH | MOVEMENT IN MOVING IMAGE 1 | MOVEMENT IN MOVING IMAGE 2 |
| EFFECT | MOVING IMAGE 1 | RIGHT TO LEFT SCANNING | FADE-IN | FADE-IN | RIGHT TO LEFT SCANNING |
| | MOVING IMAGE 2 | LEFT TO RIGHT SCANNING | FADE-OUT | LEFT TO RIGHT SCANNING | FADE-OUT |

FIG. 6C

| STILL IMAGE | WITHOUT FACE | | | |
|---|---|---|---|---|
| MOVING IMAGE COMPARISON | NO MOVEMENT IN BOTH | MOVEMENT IN BOTH | MOVEMENT IN MOVING IMAGE 1 | MOVEMENT IN MOVING IMAGE 2 |
| EFFECT | MOVING IMAGE 1 | BLACK-AND-WHITE TO COLOR | FADE-IN | FADE-IN | BLACK-AND-WHITE TO COLOR |
| | MOVING IMAGE 2 | COLOR TO BLACK-AND-WHITE | FADE-OUT | COLOR TO BLACK-AND-WHITE | FADE-OUT |

CAMERA AND CAMERA CONTROL METHOD

This application is a continuation of U.S. patent application Ser. No. 13/964,007 (referred to as "the '007 application" and incorporated herein by reference), filed on Aug. 9, 2013, titled "CAMERA AND CAMERA CONTROL METHOD," and listing Keiji KUNISHIGE, Satoshi MIYAZAKI, and Osamu NONAKA, as the inventors, the '007 application being a continuation of U.S. patent application Ser. No. 12/844,768 (referred to as "the '768 application" and incorporated herein by reference), filed on Jul. 27, 2010, titled "CAMERA AND CAMERA CONTROL METHOD," and listing Keiji KUNISHIGE, Satoshi MIYAZAKI, and Osamu NONAKA, as the inventors, the '768 application being based upon and claiming benefit under 35 U.S.C. § 119, to the filing date of prior Japanese Patent Application No. 2009-177250 filed on Jul. 30, 2009. The entire contents of the '007 application, the '768 application and the foregoing Japanese patent application are incorporated herein by reference.

BACKGROUND OF THE INVENTION

1. Field of the Invention

The present invention relates to cameras and camera control methods, and, in detail, relates to a camera having a function of moving image shooting together with still image shooting such as a digital camera, a video camera, a mobile phone with a camera, and relates to a camera control method.

2. Description of the Related Art

Still image shooting as cutting out a moment as in the conventional film photograph is comparatively simple for a user. On the other hand, in moving image shooting, it is difficult how to fix start timing and end timing and a movie camera has been used only in a formalized event such as an athletic festival and a wedding ceremony. Further, except when detailed rendering is preliminarily determined, a shot moving image has little variety and it is very difficult to make it an image worth viewing. This is because it is difficult to endure the monotonous image for a user accustomed to viewing a moving image in which composition changes frequently as in a TV program. Further, although a colorful expression can be obtained by the change of shooting parameters, it is difficult for an amateur user to do it.

Accordingly, there is an idea of combining the still image and the moving image to provide variety to the image. For example, Japanese Patent Application Laid-Open Publication No. H4-331583 (Published on Nov. 19, 1992) or Japanese Patent Publication No. 3673528 (published on Mar. 10, 1995) discloses a camera capable of shooting a still image during shooting a moving image.

Further, there is proposed a camera which edits a moving image after shooting to prevent the image from becoming monotonous. For example, Japanese Patent Application Laid-Open Publication No. 2003-110995 (published on Apr. 11, 2003) discloses a camera which provides a transition effect in the edition of a moving image when a connection rule (to end in a pan and to start in a pan) is not followed in the connection of a moving image, and allows even a user without technical knowledge for the moving image edition to perform the moving image edition easily.

SUMMARY OF THE INVENTION

The present invention aims at providing a camera and a camera control method, in which anybody can shoot a colorful image having variety easily by combining a moving image and a still image.

A camera according to the present invention, which is capable of continuous shooting before and after a still image shot according to photographer's operation, comprises: an imaging section converting an object image into image data; a still image shooting section obtaining image data of the still image according to release operation; a continuous shooting section obtaining the image data by continuous shooting before and after the obtaining of the still image in the still image shooting section; an image processing section performing image processing which is different from that of the image data obtained by the still image shooting section and changed sequentially, on the image data obtained by the continuous shooting section; and a recording section recording the image data image-processed by the image processing section.

Further, a camera according to the present invention comprises: an imaging section converting an object image into image data; a temporary recording section recording image data of a still image and a moving image according to an output of the imaging section; an image processing section determining an image effect to be provided to the image data of the moving image according to the image data recorded in the temporary recording section, to perform image processing; and a recording section recording the image data of the moving image processed by the image processing section and the image data of the still image.

Further, a camera control method according to the present invention comprises the steps of: converting an object image into image data; temporarily recording image data of a still image and a moving image according to the image data; determining an image effect to be provided to the image data of the moving image according to the temporarily recorded image data; performing image processing according to the determined image effect; and recording the image-processed image data of the moving image and the image data of the still image.

Further, a camera control method according to the present invention in which shooting is performed by photographer's operation and continuous shooting is available before and after a still image, is characterized in that image processing which is different from that in shooting the still image and changed sequentially is performed on an image in the continuous shooting, and the image-processed image is recorded or displayed.

DETAILED DESCRIPTION OF THE PREFERRED EMBODIMENTS

Figure 1:
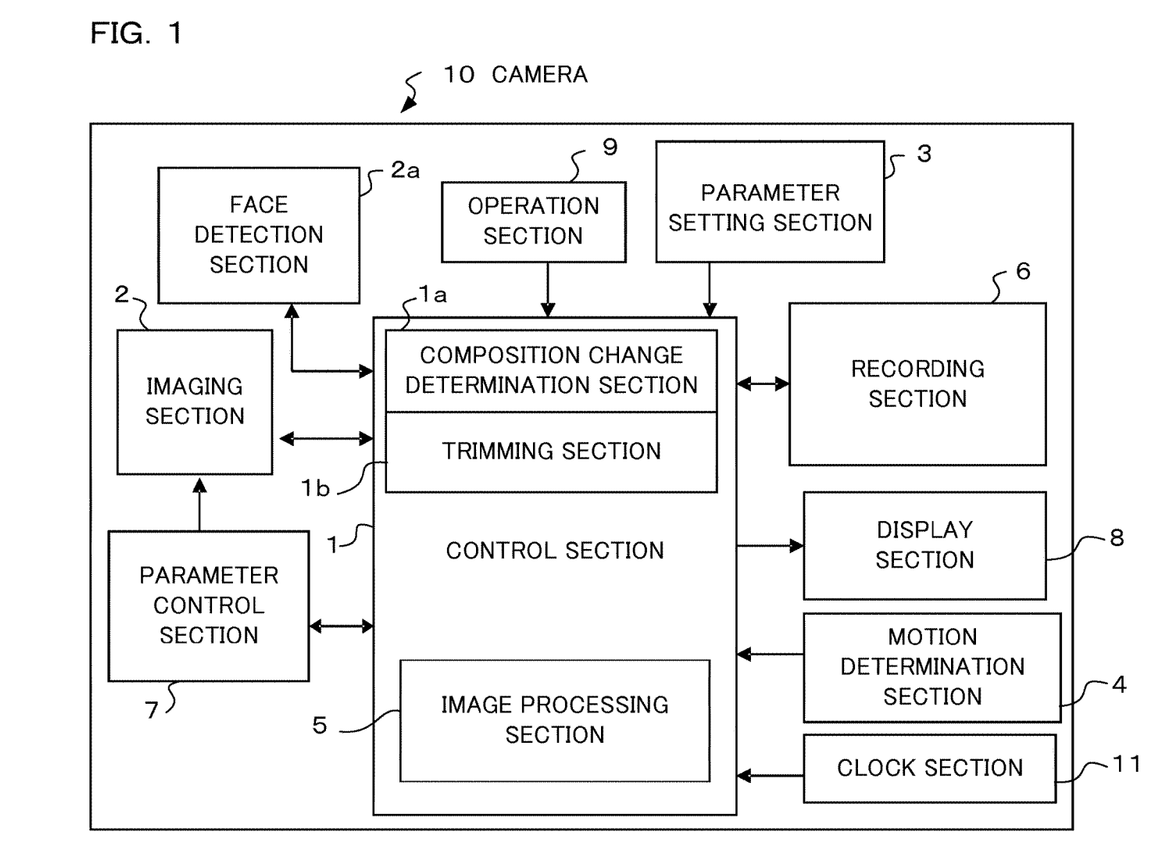
FIG. 1 is a block diagram showing an electrical configuration of a camera according to an embodiment of the present invention.

Hereinafter, preferred embodiments will be described using a camera to which the present invention is applied, according to the drawings. FIG. 1 is a block diagram showing an electrical circuit of a camera 10 according to an embodiment of the present invention. The camera 10 is a digital camera and configured with a control section 1, an imaging section 2, a parameter setting section 3, a motion determination section 4, a recording section 6, a parameter control section 7, a display section 8, an operation section 9, a clock section 11, and the like.

The imaging section 2 includes a photographing lens (zoom lens) having a zoom function and a focusing function, an exposure control section such as a shutter and an aperture, an image sensor, a drive and readout circuit of the image sensor, and the like, and converts an object image formed by the photographing lens into image data by the image sensor and outputs this image data. A face detection section 2a detects whether or not a human face is included in the object image and detects the number of human faces and the position, size, and the like thereof when the face is included there according to the image data processed by the control section 1, and then outputs the detection result to the control section 1. Note that the face detection is performed by the extraction of a shade and shadow in a face part such as an eye, a nose, and a mouth using a pattern matching method or the like.

The control section 1 controls a sequence of the entire camera 10 according to a stored program. The control section 1 has a composition change determination section 1a, a trimming section 1b, and an image processing section 5. The composition change determination section 1a determines whether or not the composition of a screen or the posture of the camera 10 is changed. In the determination of the composition change in the screen, the control unit 1 utilizes a motion vector or the like according to the image data output from the imaging section 2. Further, the posture of the camera 10 is determined according to a determination output of the motion determination section 4 which will be described hereinafter.

The trimming section 1b performs trimming processing which cuts out a part of the image data output from the imaging section 2. For the cut-out of the image data, as described hereinafter, a periphery of an object face is cut out according to the position, size, or the like of the face detected by the face detection section 2a in the scanning processing. In addition, the trimming section 1b generates an enlarged image of the shot image by the trimming at the time of reproduction according to a user's instruction.

The image processing section 5 takes in the image data output from the imaging section 2, and performs various kinds of image processing such as thinning processing, cut-out processing, edge enhancement processing, color correction, image compression and performs the image processing such as for displaying moving image live view, for recording a still image and a moving image in the recording section 6, and for reproducing and displaying the still image and the moving image. In the image compression/decompression and the like, the image processing section 5 includes circuits for a still image and a moving image according to the respective types of processing, such as a still image compression/decompression circuit, and a moving image compression/decompression circuit.

Further, the image processing section 5 temporarily stores the image data of a shot moving image for a predetermined time (e.g., approximate 0.5 seconds) before and after the still image shooting, and performs the image processing on this temporarily stored image data. In the image processing, the image processing section 5 compares the still image and the moving image and changes the image processing according to this comparison result. This image processing will be described hereinafter by the use of FIG. 3 or FIG. 6. Further, a detailed configuration of the image processing section 5 will be described by the use of FIG. 2.

The parameter setting section 3 performs the manual setting of photographing parameters with a zoom button for changing a focal distance in the imaging section 2, an aperture value setting operation section for setting an aperture value, and the like, and outputs the parameters to the control unit 1. Note that the aperture value and the like may be set automatically according to a photometrical result. The parameter control section 7 controls the imaging section 2 according to the shooting parameters set manually or set automatically in the parameter setting section 3. By controlling the shooting parameters, it becomes possible to adjust exposure, a field angle, background blurring (depth of field), and the like.

The motion determination section 4 has a six-axis sensor or the like detecting total six-axis physical amounts of acceleration in three-dimensional space, that is, three-axis acceleration and rotational speed in three-dimensional space, that is, three-axis angular speed. This motion determination section 4 can determine whether or not the posture of the camera 10 is changed.

The operation section 9 includes various operation members such as a release button, a power switch, a reproduction mode setting button, and a menu button, and determines the operational states of these operation members and sends the determination result to the control section 1. The above control section 1 performs the control of shooting or reproduction in a predetermined sequence according to the operational state of the operation member. The recording section 6 records the image data of the still image or the moving image which is obtained by the imaging section 2 and compression-processed by the image processing section 5 when a shooting instruction is provided by the release button.

The display section 8 has a display monitor such as a liquid crystal panel or an organic EL panel disposed on the rear side of the camera 10, performs live-view display before shooting, normal reproduction display of the recorded image, camera information display, and the like. A photographer can determine composition and timing while observing the live-view display. The clock section 11 performs clock operation and outputs shooting date and time information. This shooting date and time information is recorded together with the image data of the still image and the moving image when recorded in the recording section 6.

Figure 2:
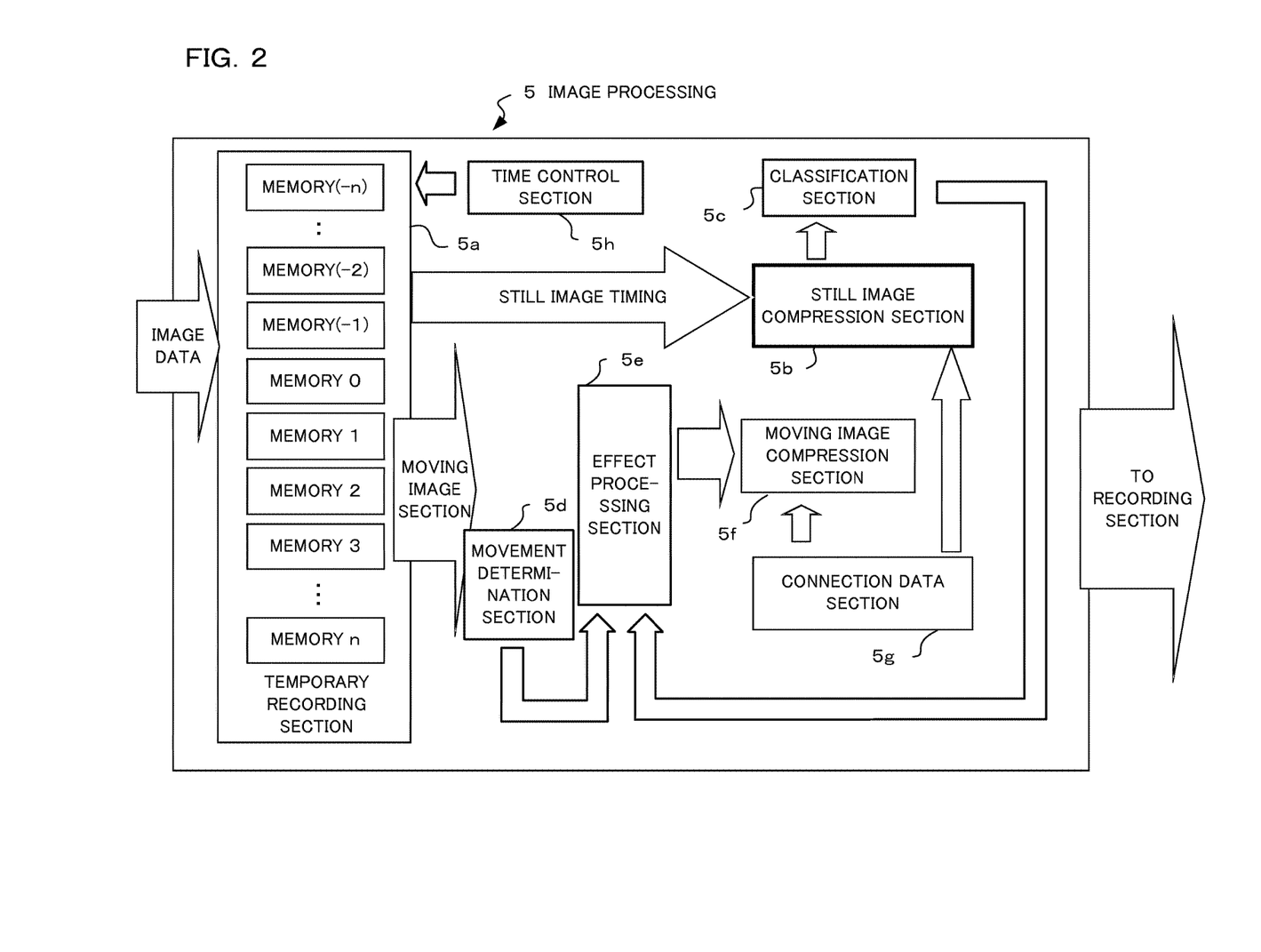
FIG. 2 is a block diagram showing details of an image processing section in a camera according to an embodiment of the present invention.

Next, a detailed configuration of the image processing section 5 will be described using FIG. 2. The image processing section 5 takes in the image data output from the imaging section 2 and performs the various kinds of image processing such as the thinning processing as described above, and, here, there will be mainly described a configuration related to the image processing for the image data of the moving images shot before and after the still image shooting.

The temporary recording section 5*a* is a memory for temporarily storing the image data from the imaging section 2, and has a memory (0) for temporarily storing the image data of the still image and a memory (−n) to a memory (−1) and a memory 1 to a memory n for temporarily storing image data sets corresponding to frames of the moving images shot for the predetermined time preceding this still image and for the predetermined time succeeding the still image (continuous shooting), respectively. Here, the memory (−n) to the memory (−1) temporarily store the moving image for the predetermined time preceding the still image shooting, the memory 0 temporarily stores the image data of the still image, and the memory 1 to the memory n temporarily store the moving image for the predetermined time succeeding the still image shooting.

A time control section 5*h* inputs the clock information from the clock section 11 and performs clock control for the moving image recording for the predetermined time. Note that all of the memory (−n) to the memory n need not to always record the image data and only limited memories among them may be used for recording the image data of the still image and the moving image.

The memory 0 for temporarily storing the image data of the still image is connected to a still image compression section 5*b*. The still image compression section 5*b* performs image compression such as the JPEG. A classification section 5*c* inputs the image data of the still image from the still image compression section 5*b* and determines whether a face is included in the still image and whether there is one person or plural persons when the face is included, for classifying the still image.

The memory (−n) to the memory (−1) and the memory 1 to the memory n storing the respective image data sets of the frames in the moving image (continuous shooting) are connected to a movement determination section 5*d* and an effect processing section 5*e*. The movement determination section 5*d* determines whether or not an object has movement before the still image shooting by using the image data of the moving image before the still image shooting which is temporarily stored in the memory (−n) to the memory (−1). Similarly, the movement determination section 5*d* determines whether or not the object has movement after the still image shooting by using the image data of the moving image after the still image shooting which is temporarily stored in the memory 1 to the memory n.

The effect processing section 5*e* inputs the movement determination result of the moving image in the movement determination section 5*d* and the classification result of the still image in the classification section 5*c*, and performs the image processing so as to generate an image effect in the input image data of the moving image according to these results. This image processing is performed according to a relationship shown in FIG. 6 to be described hereinafter. A moving image compression section 5*f* performs the moving image compression by the MPEG 4, the motion JPEG, or the like on the image data image-processed by the effect processing section 5*e*.

A connection data section 5*g* combines the image data of the moving image generated by the moving image compression section 5*f* and the image data of the still image generated by the still image compression section 5*b*, and generates connection information for reproducing both of the image data sets continuously. The connection information by the connection data section 5*f*, the image data from the still image compression section 5*b*, and the image data from the moving image compression section 5*g* are sent to the recording section 6 and recorded as one image file. When the image data recorded in the recording section 6 is reproduced, it is possible to increase reproduction speed, to reduce the reproduction speed adversely, and to reproduce the image data in fast forward or in slowmotion. Further, how many seconds the memory capacity of the temporary recording section 5*a* corresponds to changes depending on how many frames are shot in a second. The temporary recording section 5*a* is a memory to be used in such a freedom.

Figure 3:
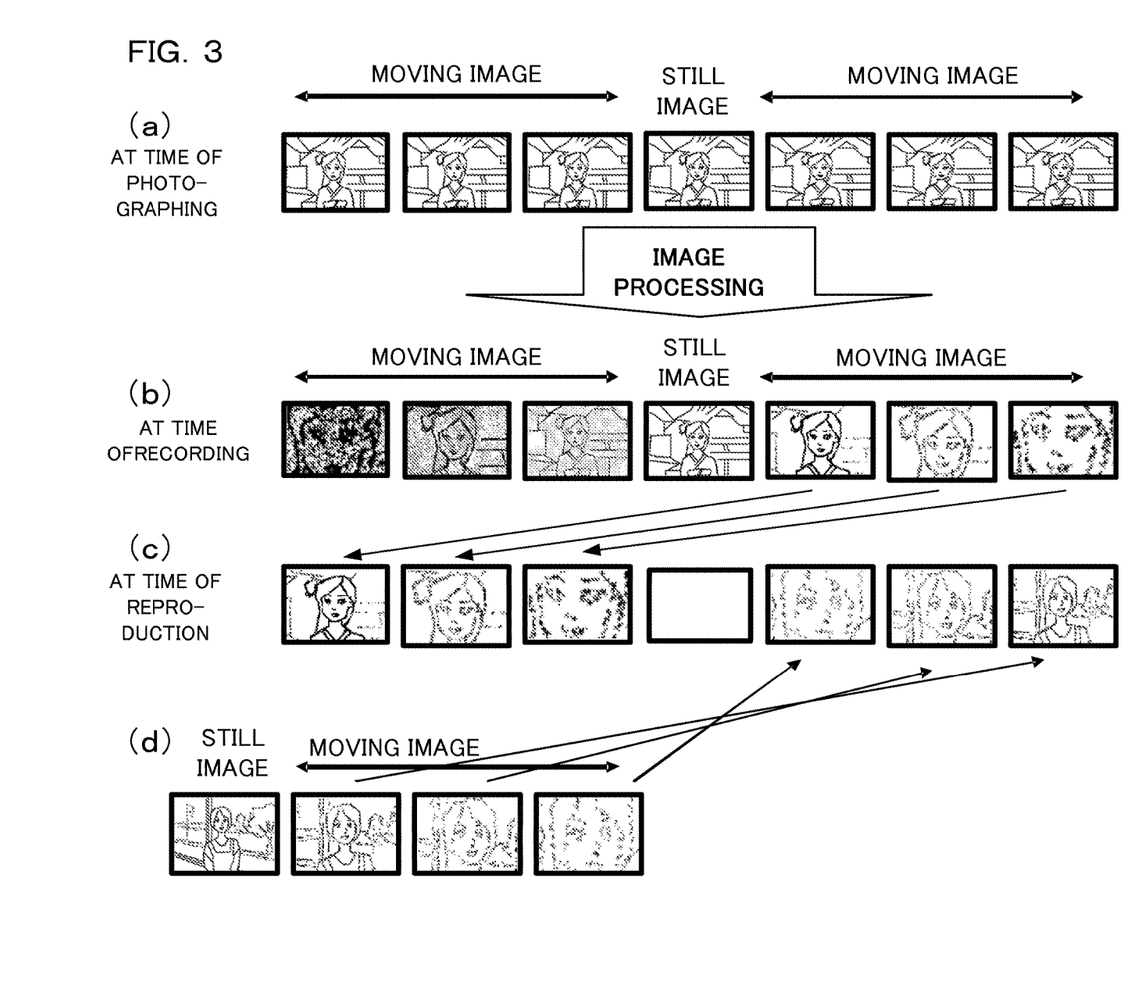
FIG. 3 is a diagram showing a still image and moving images shot before and after the still image and also showing image processing of these images, when an object includes one person, in a camera according to an embodiment of the present invention.

Next, the image processing for the moving image performed according to a comparison result of the still image and the moving image will be described using FIG. 3 to FIGS. 6A to 6C. FIG. 3(*a*) shows a state of images before and after the still image shooting. As described hereinafter, the camera in the present embodiment also temporarily records the image data of the moving image (continuous shooting) for a predetermined time (e.g., 0.5 seconds) before and after the still image shooting together with the image data of the still image.

Note that, in the present embodiment, the image data of the obtained moving image and still image is not directly recorded and is recorded in the recording section 6 after the image processing has been carried out to provide the image effect to the moving image so as to make the moving image worth viewing at the time of reproduction. The image processing is performed so as to allow the image to be viewed in expectation by comparing and determining the still image and the moving image before and after the still image and by switching the images according to the determination result.

FIG. 3 (*b*) shows an example of the image processing at the time of recording. In this example, only one person is captured in a still image and movement is not included in the moving image before or after the still image, and therefore the moving image before the still image shooting is made to change from a close-up state to a normal image (zoom-down) and the moving image after the still image shooting is made to change from a normal image to a close-up state (zoom-up). The zoom-up or the zoom-down is performed here for the purpose of creating a feeling such as the feeling of focusing on this person who is alone and has little movement. In addition, the moving image before the still image shooting is subjected to fade-in processing and the moving image after the still image shooting is subjected to fade-out processing. While plural transition effects are combined here, it is obvious that all of such effects may not be necessarily provided. For example, in FIGS. 6A to 6C which will be described hereinafter, only one representative effect is described and explained for simplicity.

While the combination of the moving image and the still image recorded in this manner may be directly reproduced and displayed, a reproduction display as shown in FIG. 3 (*c*) may be performed for providing further variety. In this example, only the moving images provided with the image effect are gathered and reproduced continuously. That is, in FIG. 3(c), the image-processed moving image after the still image shooting is reproduced and consecutively an image-processed moving image after another still image shooting is reproduced in a reversed sequence.

While two moving images are reproduced consecutively in FIG. 3(c), further another moving image may be reproduced consecutively. In this case, when arranging the moving images in consideration of the order thereof so that the image may change smoothly by reproducing a zoom-down image after the reproduction of a zoom-up image and by reproducing a fade-out image after the reproduction of a fade-in image, it is possible to enjoy a natural screen transition. All the images may always finish in a close-up image for creating a feeling of a certain kind of rhythm. Further, as described above, the reproduction speed is not necessarily the same as the speed at the time of shooting, and the image may be reproduced in somewhat fast forward or may be reproduced in slow motion adversely.

Figure 4:
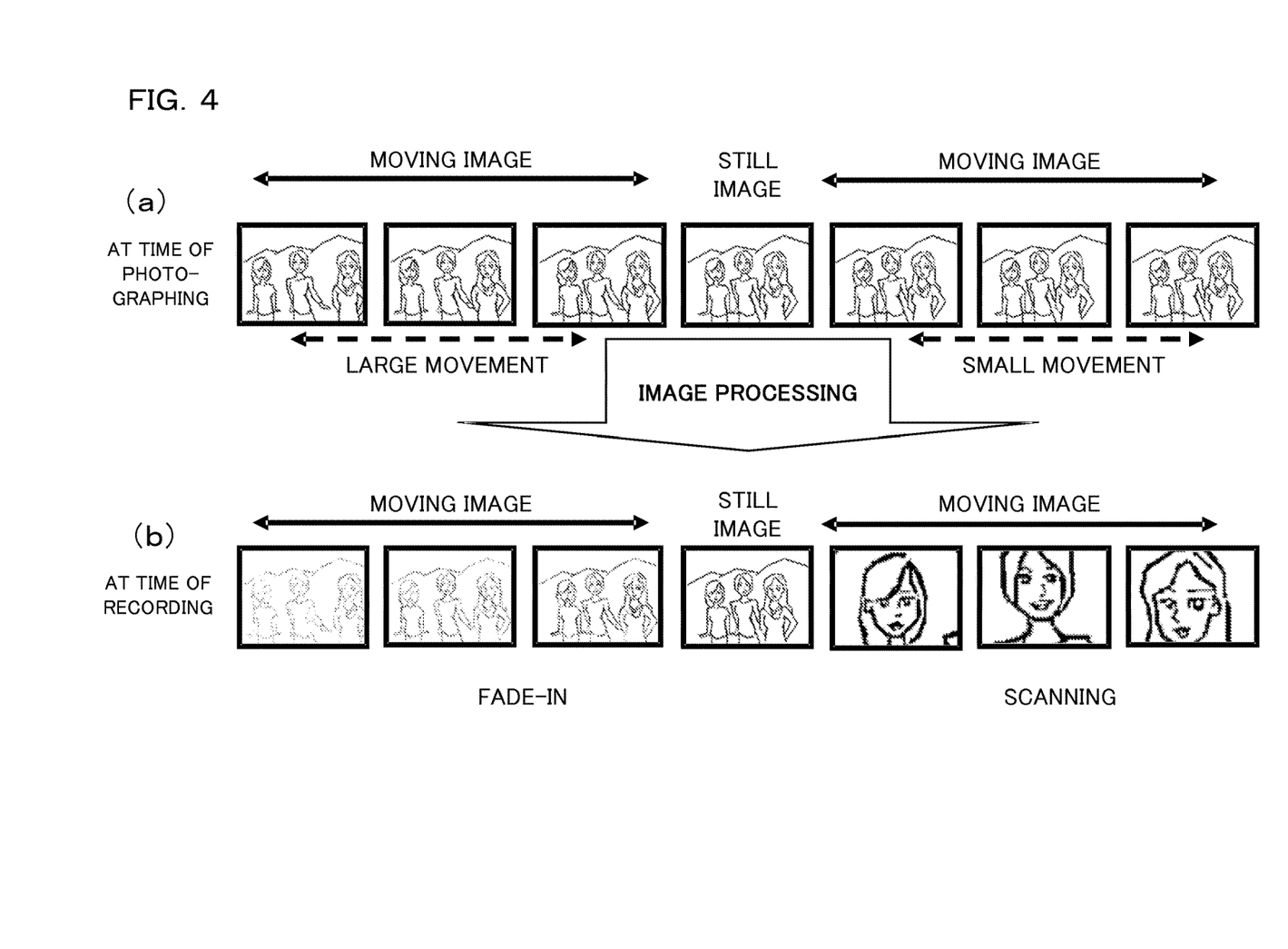
FIG. 4 is a diagram showing a still image and moving images shot before and after the still image and also showing image processing of these images, when an object includes plural persons, in a camera according to an embodiment of the present invention.

Next, using FIG. 4, another example will be described for the image processing of the moving image performed according to a comparison result of the still image and the moving image. In this another example, the still image includes plural persons, and spacing between the persons is gradually narrowed from a wide state and movement exists in the moving image before the still image shooting. However, the moving image after the still image shooting shows little movement. In such a situation, this example performs the image processing of fade-in on the moving image before the still image shooting, that is, processing to change an over-exposure state to an appropriate exposure state, for the image processing at the time of image recording. Here, the fade-in is performed for the purpose of obscuring the origin of the movement and allowing the whole movement of the plural persons to be viewed.

Further, scanning processing which displays a close-up face of each person is performed on the moving image after the still image shooting. This scanning processing will be described using FIG. 5. In an example shown in FIG. 5, the faces of three persons are captured and trimming processing is performed so as to close up these three person's faces sequentially. For this purpose, the centers of the left end person's face and the right end person's face are determined for a start point and an end point of the face movement, respectively. Then, the scanning image can be obtained by the following process: obtaining an average face size, determining a move line 23a on the upper side and a move line 23b on the lower side in consideration of this average face size, and cutting out a trimming image as if a trimming frame (21a, 21b, or 21c) moves between these lines as sliding. This scanning processing will be described hereinafter using FIG. 10.

Figure 6A:
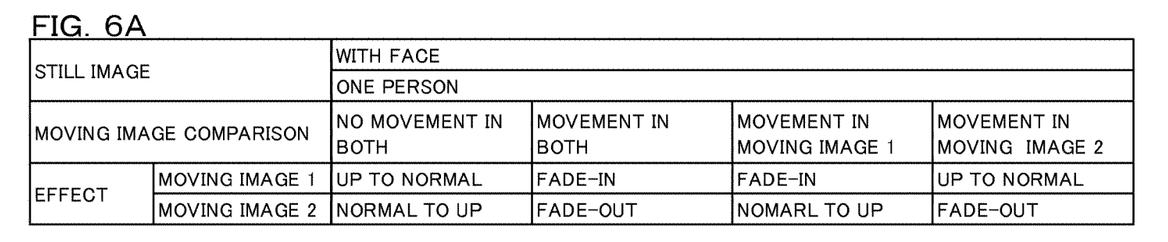
FIGS. 6A to 6C are diagrams showing a relationship between a still image and moving image processing determined according to a moving image, in a camera in an embodiment of the present invention.
Figure 6B:
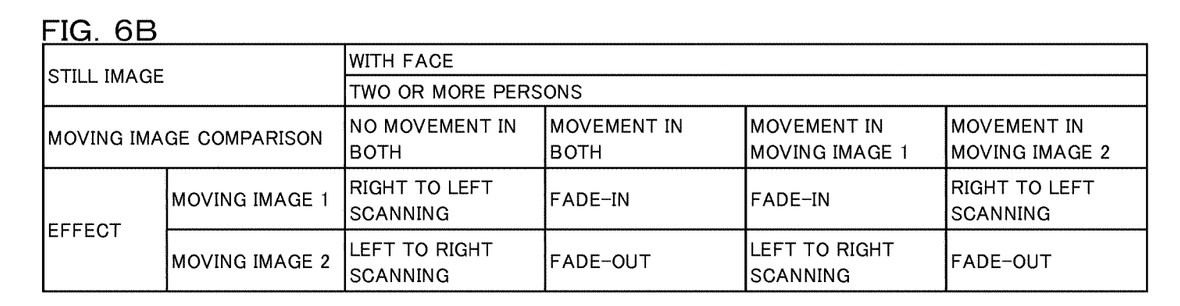
Figure 6C:
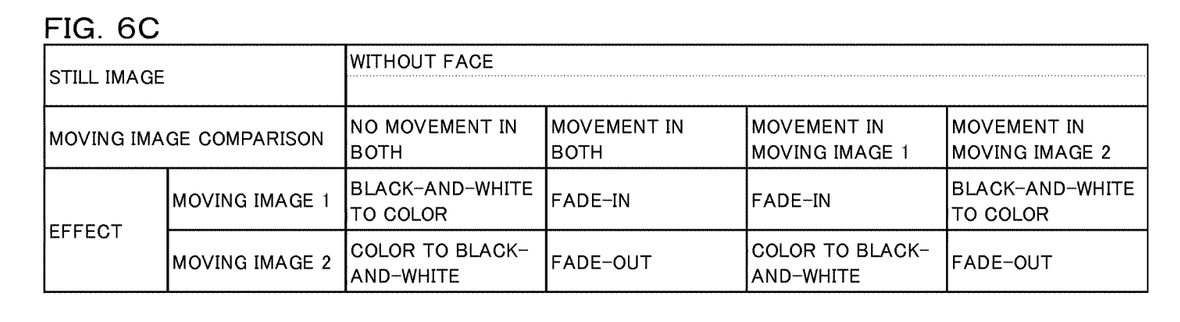

The control section 1 and the image processing section 5 perform the image processing of the moving image therein according to the comparison result of the still image and the moving image as described above. FIGS. 6A to 6C show an example of the moving image processing according to the comparison result of the still image and the moving image. FIG. 6A shows the image processing for the moving image in a case in which the classification section 5c determines that the still image has a face and there is one person. In this case, when the moving image has movement, the fade-in or fade-out processing is performed so as to obscure the start or the end of the movement, and, when the moving image does not have movement, the zoom-up processing is performed so as to allow face expression to be viewed clearly. Note that, in the drawing, "Moving image 1" means the moving image before the still image shooting and "Moving image 2" means the moving image after the still image shooting. While a representative effect is illustrated here as described above, it is obvious that another effect, for example, exposure change effect, blurring effect, or the like may be used additionally. Such processing is performed by the effect processing section 5e of the image processing section 5.

FIG. 6B shows the image processing for the moving image in a case in which the classification section 5c determines that the still image has a face and there are two or more persons. In this case, when the moving image has movement, the fade-in processing or the fade-out processing is performed so as to obscure the start or the end of the movement as in the case of one person. Further, when the moving image does not have movement, the scanning processing is performed so as to allow the face expression of each person to be viewed clearly.

FIG. 6C shows a case in which the classification section 5c determines that the still image does not have a face, and this case means that probably the still image is a landscape image. Accordingly, when the moving image has movement, the fade-in processing or the fade-out processing is performed so as to obscure the start or the end of the movement as in the case of one person. Further, when the moving image does not have movement, while the zoom-up may be performed, the present embodiment causes the moving image to change from a black-and-white image to a color image so as to distinguish color clearness. Note that, the list of the moving image processing shown in FIGS. 6A to 6C is an illustration, and the conditions may be exchanged and another processing may be combined.

The present embodiment performs the moving image shooting continuously after the still image shooting. Therefore, the image becomes undesirable for viewing unless the camera 10 is focused on the object for a predetermined time (0.5 seconds in the embodiment) after the still image shooting. Accordingly, the present embodiment automatically extracts a person 25 positioned in the center of a screen and records the face part of the person 25 after the trimming so as not to apply stress on the photographer more than necessary.

Figure 7:
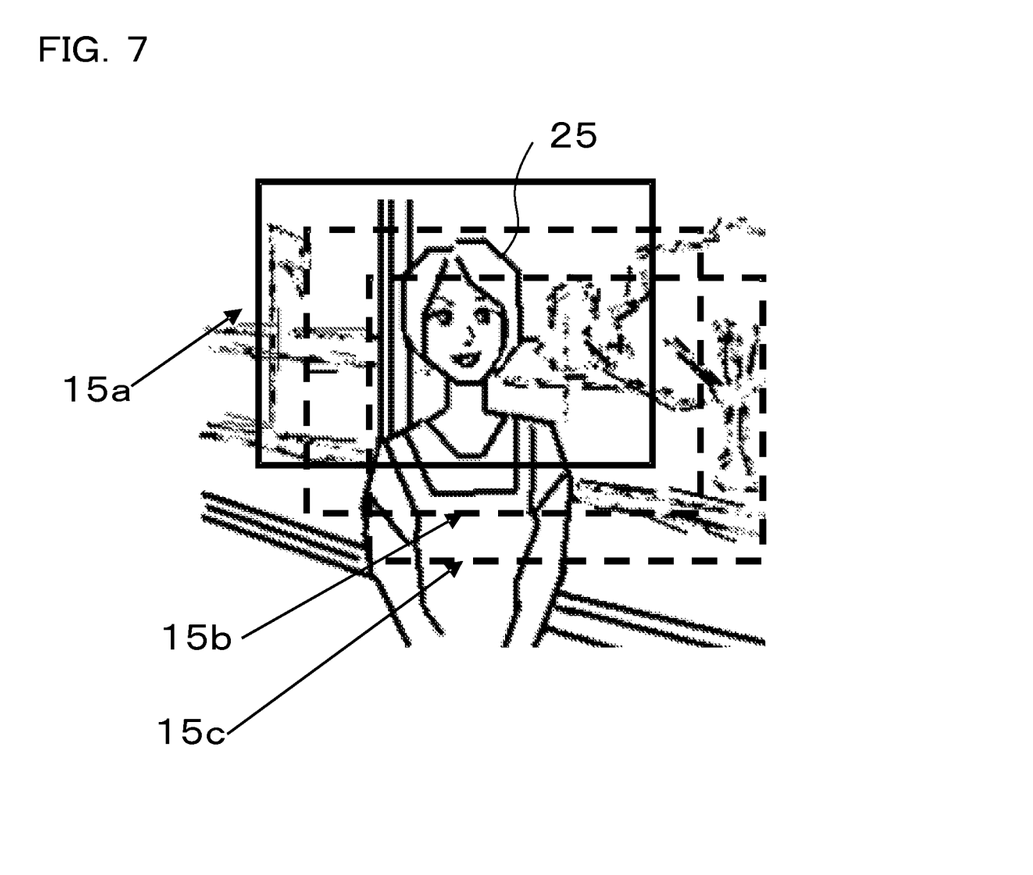
FIG. 7 is a diagram showing a state of a camera changing direction after still image shooting, in a camera according to an embodiment of the present invention.

This trimming method will be described using FIG. 7 and FIGS. 8A to 8F. FIG. 7 shows a state of shooting a person 25 of an object, and the still image is captured in a shooting area 15a and the succeeding moving image is captured in shooting areas 15b and 15c. At this time, FIG. 8A is an image corresponding to the shooting area 15a, FIG. 8B is an image corresponding to the shooting area 15b, and FIG. 8C is an image corresponding to the shooting area 15c, among images shot by the camera 10.

Figure 8A:
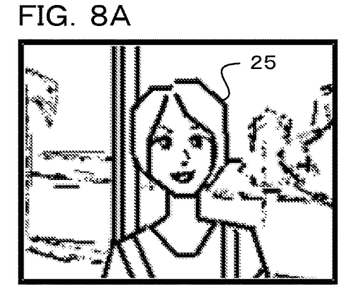
FIGS. 8A to 8F are diagrams showing a state of recording and displaying a center part of a screen as a moving image even when the camera has changed direction after still image shooting, in a camera according to an embodiment of the present invention.
Figure 8B:
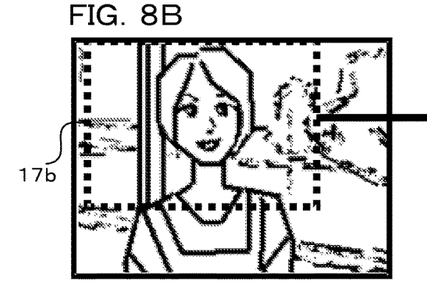
Figure 8C:
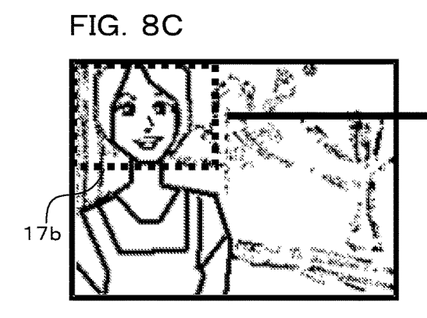
Figure 8D:
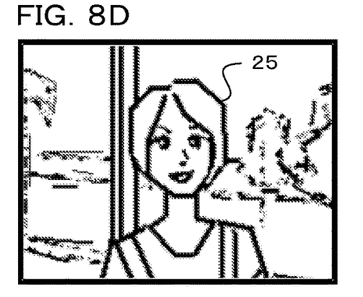
Figure 8E:
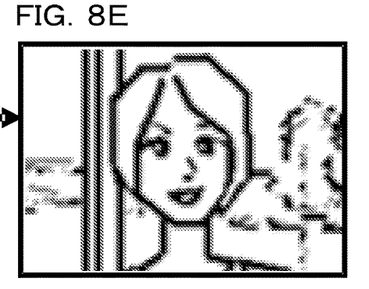
Figure 8F:
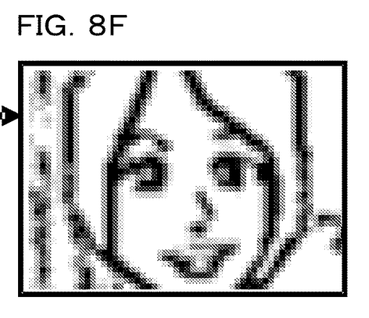

The image of FIG. 8A corresponding to the shooting area 15a of the still image is directly recorded as shown in FIG. 8D, but, for the image corresponding to the shooting area 15b of the moving image, a trimming area 17b including the screen center of the shooting area 15a (face of the person 25 exists in the center) is recorded as shown in FIG. 8E, and for the image corresponding to the shooting area 15c of the moving image, a trimming area 17c including the screen center of the shooting area 15a is recorded as shown in FIG. 8F. Here, while the aspect ratio of the trimming area 17b or 17c may be changed from the aspect ratio of the still image, the aspect ratio is made the same in the present embodiment because the same aspect ratio can avoid uncomfortable feeling.

In this manner, although the photographer changes the composition into the shooting areas 15a to 15c, the image data of the trimming areas 17b and 17c corresponding to the center part of the still image screen is recorded in the recording section 6. Even when a photographer changes the composition into the shooting areas 15b and 15c unconsciously in relief after the still image shooting, the center part of the screen is recorded by the trimming. To use only the face part by the trimming can provide a moving image expression for capturing the expression change of the object. That is, it is possible to record a process in which the object comes to be relaxed, in the transition of the image as in FIGS. 8D to 8F, and it is possible to recall a memory.

Note that the trimming processing described using FIG. 7 and FIGS. 8A to 8F is carried out by the composition change determination section 1a and the trimming section 1b within the control section 1. That is, when the composition change determination section 1a determines that the composition has been changed into the shooting areas 15a to 15c, the trimming section 1b performs the trimming processing according to the determination result. This trimming-processed image data is sent to the above described temporary recoding section 5a and the above described image processing of the moving image is carried out. That is, the image data temporarily recorded in each memory in the temporary recording section 5a is trimming-processed by the trimming section 1b and recorded again in the same memory, and then the result is subjected to the moving image compression.

Figure 9:
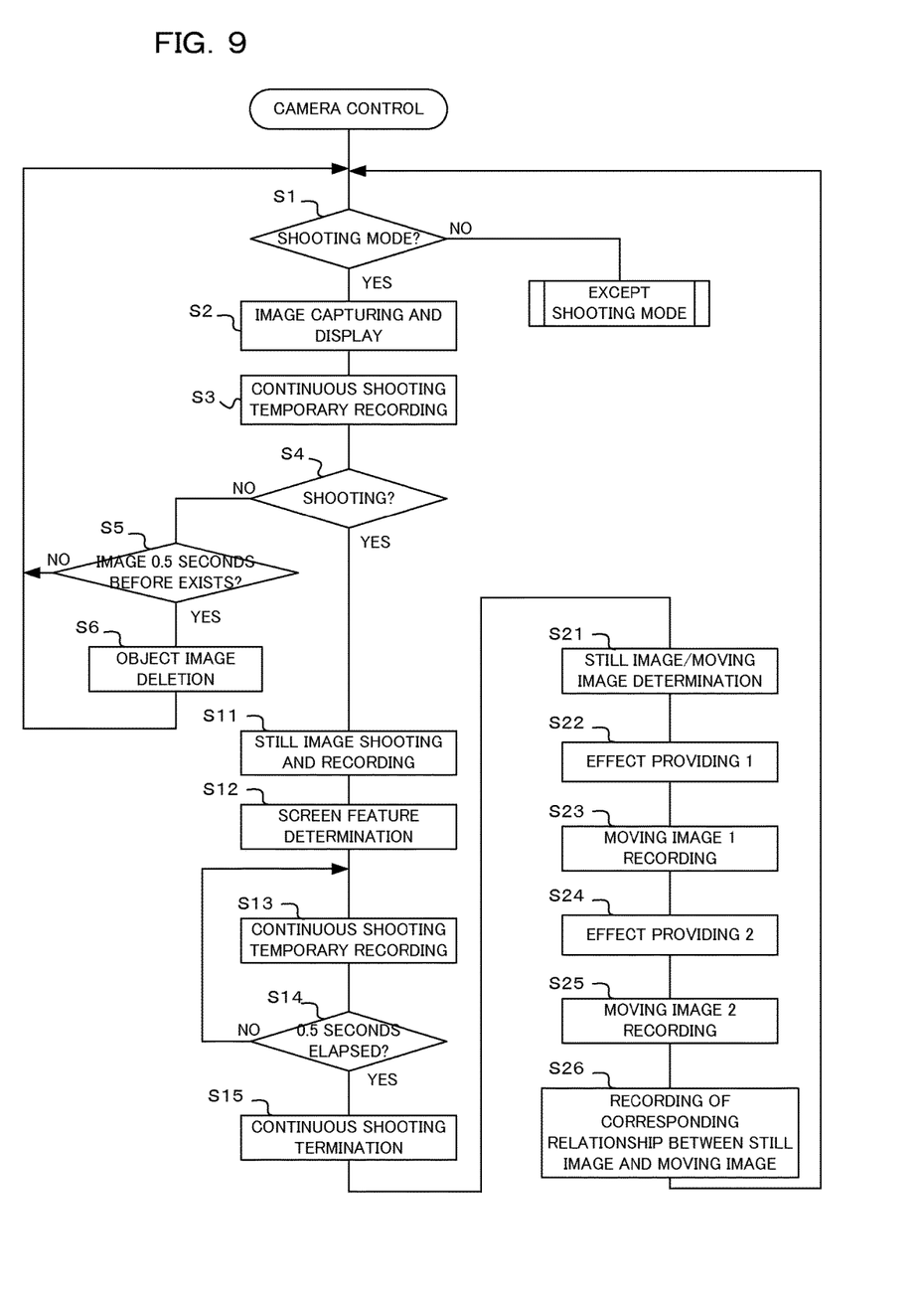
FIG. 9 is a flowchart showing camera control operation of a camera according to an embodiment of the present invention.

Next, the operation of the camera 10 according to the present embodiment will be described using a camera control flowchart shown in FIG. 9. When the camera 10 is powered and activated, the flowchart shown in FIG. 9 starts. After the start, first it is determined whether a shooting mode or not (S1). This camera 10 is provided with the shooting mode, a reproduction mode, and the like, and a mode selection state set by a photographer is determined according to an operation state of the operation section 9.

When the determination result in Step S1 does not indicate the shooting mode, a mode except the shooting mode is carried out. The other mode such as the reproduction mode is carried out here but detailed description will be omitted. When the mode except the shooting mode is carried out, the process returns to Step S1. When the result of the determination in Step S1 indicates the shooting mode, image capturing and display are performed (S2). In this step, the image processing section 5 performs the image processing on the image data obtained by the imaging section 2 and the display section 8 performs live view display. The photographer can determine composition and a shutter chance while watching the live view display.

Subsequently, temporary recording of continuous shooting is performed (S3). Here, the image data is obtained from the imaging section 2 repeatedly in predetermined timing, and the obtained image data is sequentially recorded temporarily into the memory (−n) to the memory (−1) in the temporary recording section 5a. While the number of pixels or the like of the moving image data recorded here may be equivalent to that of the still image data, the moving image data may have small number of pixels when compared to the still image data, since generally the number of pixels in the moving image is not required to be so large as that of the still image.

After the continuous shooting temporary recording has started, it is determined whether shooting or not. (S4). Here, it is determined whether or not the release button in the operation part 9 has been operated. If this determination result does not indicate the shooting, then it is determined whether an image of 0.5 seconds before exists or not, while the image capturing and display and the continuous shooting temporary recording are continued (S5). The present embodiment temporarily records the moving image for a predetermined time, here, 0.5 seconds, before the still image shooting and deletes the moving image before the 0.5 seconds if it exists. In this step S5, when 0.5 seconds have elapsed since the start of the continuous shooting temporary recording, it is determined that the image of 0.5 seconds before exists.

When the determination result in Step S5 indicates that the image of 0.5 seconds before exists, the object image is deleted (S6). Here, the image before the 0.5 seconds is deleted from among the images temporarily recorded in the memory (−n) to the memory (−1), and the recording positions are changed such that the latest image is recorded temporarily into the memory (−1). After the deletion of the object mage, or when the determination result in Step S5 indicates that the image of 0.5 seconds before does not exist, the process returns to Step S1.

When the determination result in Step S4 indicates the shooting, the still image shooting and the recording are performed (S11). In this step, the image data output from the imaging section 2 is recorded temporarily into the memory 0 in the temporary recording section 5a, and the still image data is recorded in the recording section 6 after the compression processing in the still image compression section 5b.

Subsequently, screen feature determination is performed (S12). Here, the classification section 5c performs screen feature determination such as whether a face exists or not, and whether there is one person or plural persons if the face exists, using the image data of the still image. Note that this screen feature determination may be performed in Step 2 every time the shooting is performed, using the image data obtained at that time.

Next, the temporary recording of the continuous shooting is performed (S13). While the temporary recording of the moving image before the shooting is performed in Step S3, here, the image data of the moving image after the shooting is temporarily recorded sequentially into the memory 1 to memory n in the temporary recording section 5a. After the temporary recording of the continuous shooting, it is determined whether a predetermined time, here, 0.5 seconds, has elapsed or not since the start of the continuous shooting after the shooting (S14). When 0.5 seconds have not elapsed in this determination result, the process returns to Step S13 and the continuous shooting is continued.

When 0.5 seconds have elapsed in the determination result in Step S14, the continuous shooting is terminated (S15), and still image/moving image determination is performed (S21). Here, the feature of the still image (a face exists or not, and one person or plural persons) and comparison of the moving images before and after the shooting (movement exists or not) are determined as described using FIG. 6, and the effects to be provided respectively to the moving image before the shooting and the moving image after the shooting are determined.

Subsequently, the effect processing section 5e performs the image processing of Effect providing 1 on the moving image before the shooting determined in the still image/moving image determination (S22), and this image-processed image data is recorded in the recording section 6 (S23). Further, the effect processing section 5e performs the image processing of Effect providing 2 on the moving image after the shooting determined in the still image/moving image determination (S24), and this image-processed image data is recorded in the recording section 6 (S25).

After the recording of Moving image 2 after the still image image-processed, a corresponding relationship between the still image and the moving image is recorded (S26). Since generally image files of the still image and the moving image are frequently configured separately, the connection data section 5g records the corresponding relationship among the moving image before the still image shooting, the still image, and the moving image after the still image shooting. After the recording of the corresponding relationship, the process returns to Step S1.

Figure 5:
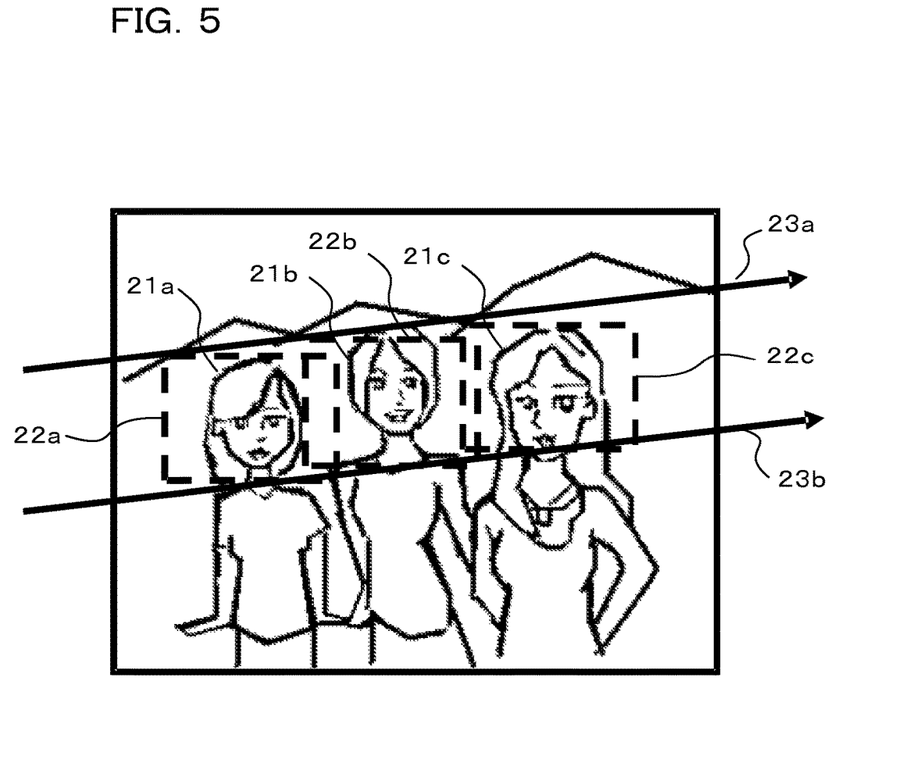
FIG. 5 is a diagram showing image processing by scanning when a moving image captures plural persons, in a camera in an embodiment of the present invention.
Figure 10:
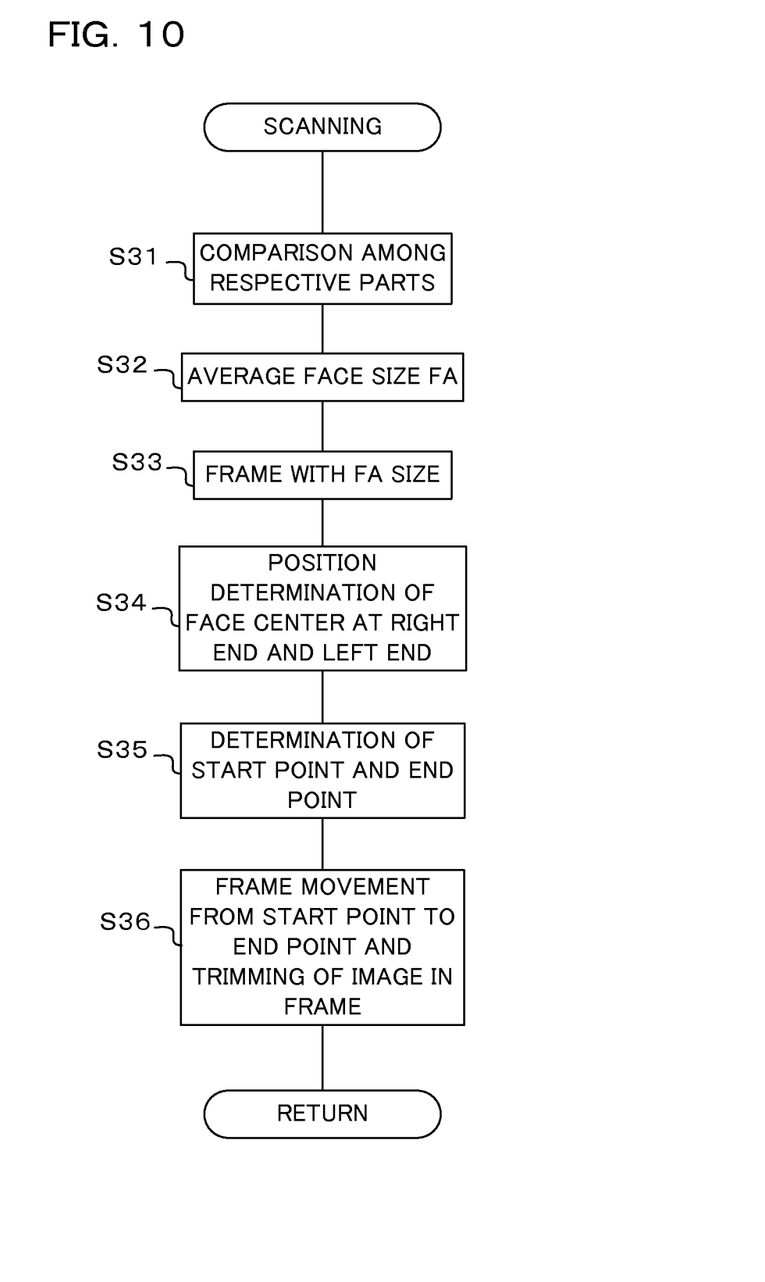
FIG. 10 is a flowchart showing scanning operation of a camera according to an embodiment of the present invention.

Next, for a case in which Effect providing 1 or 2 is provided in Step S22 or Step S24, the operation of the scanning case in which its effect is described using FIG. 5, will be described using a flowchart shown in FIG. 10. When the scanning flow starts, first respective parts are compared to each other (S31). The positions and sizes of faces are detected by the face detection section 2a and the positions or sizes of the faces are compared to each other using this detection result.

Subsequently, an average face size FA is obtained (S32). An average is obtained from the face sizes obtained in Step S31 in which the face sizes are compared to each other as described above, and this average value is defined as FA. A frame having a size the same as this value FA is determined (S33). This frame corresponds to each of the trimming frames 22a to 22c and works as a frame for cutting out each face from the image data.

Note that, while each size of the trimming frames 22a to 22c may be changed according to each face size, the present embodiment unifies the trimming frame sizes into the average face size, since the changing of the trimming frame size is uncomfortable for viewing in the reproduction display of the scanning. Such processing can provide an effect as only a certain range is being scanned, but sometimes a part of a human face is cut out. For avoiding this problem, the trimming frame may be determined according to the largest face.

Next, the center positions of the faces at the right end and left end are determined (S34), and a start point and an end point are determined (S35). Here, the center positions of the most left side face and the most right side face are obtained from among the faces detected by the face detection section 2a, and the center positions of these faces are determined to be the start point and the end point, respectively.

Subsequently, the frame is moved from the start point to the end point and the image existing within the frame at this time is trimmed (S36). Here, from the right end or the left end to the other end, a trimmed image of a face changes as flowing as in the moving image after the still image shooting of FIG. 4(b). Although a part of the face between the start point and the end point of the scanning may be cut out, the image processing is performed so that the discontinuity of the moving image may be prevented and the moving image may change smoothly. When the scanning reaches the end point, the process returns from this flow to the original flow.

While, in Effect providing 1 in Step 22 and Effect providing 2 in Step S24, the image processing such as fade-in/fade-out and zoom-in/zoom-out is also performed except the scanning, this is publicly known image processing and detailed description will be omitted.

As described above, an embodiment of the present invention performs continuous shooting before and after the still image, which can be shot by anybody, without being recognized by a photographer or an object, and performs different image processing on the image in continuous shooting according to a determination result of the image at this time. Accordingly, anybody easily can shoot or record a colorful image with variety.

Note that, while an embodiment of the present invention determines that a continuous shooting (moving image shooting) time before or after the still image is 0.5 seconds, this is an illustration and the time may be longer or shorter. Further, while the still image and the moving image, which is shot continuously and then image-processed, are recorded in the recording section 6 immediately, these images may be displayed in the display section 8 without being recorded or approximately at the same time as being recorded.

Further, while examples of the image processing for the moving image, zoom-up/zoom-down, fade-in/fade-out, scanning, and color/black-and-white, are shown in FIG. 6, what image processing to be performed may be changed optionally according to the determination result. In addition, not limited to one kind of processing, some kinds of processing may be combined. Further, while the image processing of the moving image is changed according to the number of faces or the movement of a face, obviously the image processing may be changed by another classification condition such as face expression not limited to the number of faces and the movement of the face.

Further, while the present embodiment explains equipment for shooting using a digital camera, the camera may be a single reflex camera or a compact digital camera and may be a moving image camera such as a video camera and a movie camera, and further may be a camera incorporated in a mobile phone, a mobile information terminal (PDA: Personal Digital Assistant), a game console, or the like. Anyway, the present invention can be applied to any camera if the camera is capable of shooting the still image and the moving image.

The present invention is not limited to the above embodiment as it is and can be realized by modifying the constituents in a range without departing from the spirit thereof in the step of implementation. In addition, various inventions can be formed by optionally combining a plurality of constituents disclosed in the above embodiment. For example, some constituents may be omitted from all the constituents shown in the embodiment. Further, the constituents may be optionally combined across the different embodiments.

What is claimed is:

1. A camera capable of continuous shooting before a still image shot according to a photographer's operation, the camera comprising:
   an imaging section converting an object image into image data;
   a still image shooting section obtaining image data of the still image according to a release operation input by the photographer;
   a continuous shooting section obtaining the image data by continuous shooting before the obtaining of the still image in the still image shooting section, wherein an end time of the image data obtained by the continuous shooting section is defined based on a time of the release operation input by the photographer;
   an image processing section including an image effect processing section performing an image processing effect on the image data obtained by the continuous shooting section, wherein the image processing effect performed on the image data obtained by the continuous shooting section obscures a start or an end of movement in the image data obtained by continuous shooting; and a recording section recording the image data image-processed by the image processing section in association with the image data of the corresponding still image such that both (1) the image data image-processed by the image processing section and (2) the image data of the corresponding still image, can be reproduced continuously.

2. The camera of claim 1 wherein the image processing effect performed on the image data obtained by the continuous shooting section that obscures a start or an end of movement in the image data obtained by continuous shooting is an image processing effect selected from a group of image processing effects including (A) fade-in and (B) fade-out.

3. The camera of claim 1 wherein the image processing effect performed on the image data obtained by the continuous shooting section is a blurring effect.

4. The camera of claim 1 wherein the image data of the still image includes a first number of pixels, and
wherein the image data obtained by continuous shooting before the obtaining of the still image in the still image shooting section includes a second number of pixels, which is less than the first number of pixels.

5. The camera of claim 1 further comprising:
a connection data section generating connection data for reproducing, continuously, the associated image data image-processed by the image processing section and image data of the corresponding still image.

6. The camera of claim 1 wherein the image processing effect is applied in changing amounts to multiple frames of the image data obtained by the continuous shooting section such that the image processing effect is applied to multiple consecutive frames of image data non-uniformly with respect to time.

7. A camera capable of continuous shooting after a still image shot according to a photographer's operation, the camera comprising:
an imaging section converting an object image into image data;
a still image shooting section obtaining image data of the still image according to a release operation input by the photographer;
a continuous shooting section obtaining the image data by continuous shooting after the obtaining of the still image in the still image shooting section, wherein a start time of the image data obtained by the continuous shooting section is defined based on a time of the release operation input by the photographer;
an image processing section including an image effect processing section performing an image processing effect on the image data obtained by the continuous shooting section, wherein the image processing effect performed on the image data obtained by the continuous shooting section obscures a start or an end of movement in the image data obtained by continuous shooting; and
a recording section recording the image data image-processed by the image processing section in association with the image data of the corresponding still image such that both (1) the image data image-processed by the image processing section and (2) the image data of the corresponding still image, can be reproduced continuously.

8. The camera of claim 7 wherein the image processing effect performed on the image data obtained by the continuous shooting section that obscures a start or an end of movement in the image data obtained by continuous shooting is an image processing effect selected from a group of image processing effects including (A) fade-in and (B) fade-out.

9. The camera of claim 7 wherein the image processing effect performed on the image data obtained by the continuous shooting section is a blurring effect.

10. The camera of claim 7 wherein the image data of the still image includes a first number of pixels, and
wherein the image data obtained by continuous shooting before the obtaining of the still image in the still image shooting section includes a second number of pixels, which is less than the first number of pixels.

11. The camera of claim 7 further comprising:
a connection data section generating connection data for reproducing, continuously, the associated image data image-processed by the image processing section and image data of the corresponding still image.

12. A method for use with a camera capable of continuous shooting before and/or after a still image shot, the method comprising:
obtaining still image data responsive to a user input associated with a release operation;
obtaining continuous image data before and/or after the still image data is obtained, wherein an end time and/or a start time of the continuous image data is defined based on a time of the release operation associated with the user input;
performing an image processing effect on the continuous image data to generate image processed continuous image data, wherein the image processing effect obscures a start or an end of movement in the continuous image data; and
recording the image-processed continuous image data in association with the still image data such that both (1) the image-processed continuous image data and (2) the corresponding still image data, can be reproduced continuously.

13. The method of claim 12 wherein the image processing effect obscures a start or an end of movement in the continuous image data by one of (A) fading-in, or (B) fading-out.

14. The method of claim 12 wherein the image processing effect performed on the continuous image data is a blurring effect.

15. The method of claim 12 wherein the still image data includes a first number of pixels, and wherein the continuous image data includes a second number of pixels, which is less than the first number of pixels.

16. The method of claim 12 further comprising:
generating connection data for reproducing, continuously, the associated image processed continuous image data and corresponding still image data.

17. The method of claim 12 further comprising:
obtaining second still image data responsive to a second user input;
obtaining second continuous image data before and/or after the second still image data is obtained;
performing an image processing effect on the second continuous image data to generate second image processed continuous image data; and
reproducing the image processed continuous image data and the second image processed continuous image data consecutively.

18. The method of claim 12 wherein the continuous image data obtained before and/or after the still image data is obtained over a preset length of time.

19. The method of claim 12 further comprising:
classifying at least one of (A) the still image data, and (B) the continuous image data, to generate a classification result,
wherein the act of performing an image processing effect on the continuous image data to generate image processed continuous image data includes selecting, based on the classification result, one of a plurality of candidate image processing effects as the image processing effect performed on the continuous image data.

20. The method of claim 12 further comprising:
classifying both (1) the still image data, and (2) the continuous image data, to generate a classification result,
wherein the act of performing an image processing effect on the continuous image data to generate image processed continuous image data includes selecting, based on the classification result, one of a plurality of candidate image processing effects as the image processing effect performed on the continuous image data.

* * * * *